S. D. FELSING.
MACHINE FOR CLEANING AND SEPARATING SEED GRAIN.
APPLICATION FILED JAN. 28, 1911.
995,853.
Patented June 20, 1911.
3 SHEETS—SHEET 1.
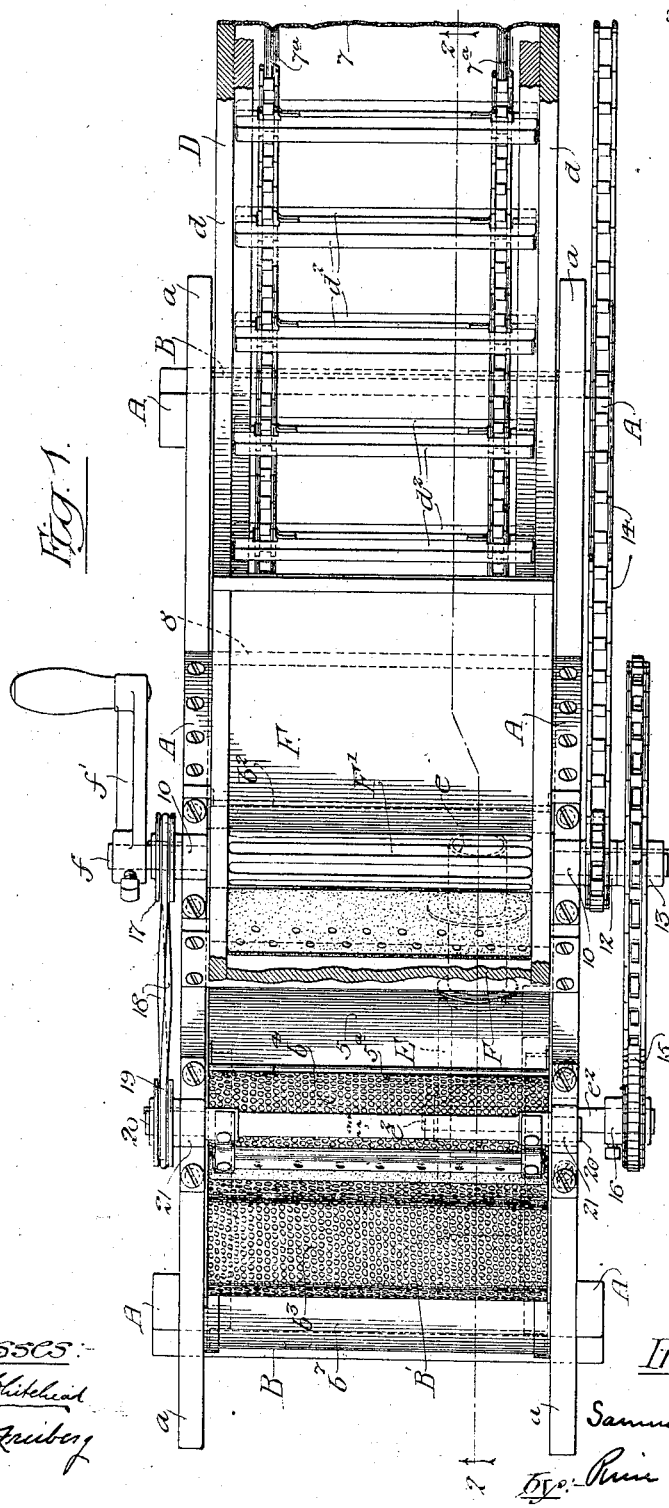

S. D. FELSING.
MACHINE FOR CLEANING AND SEPARATING SEED GRAIN.
APPLICATION FILED JAN. 28, 1911.
995,853.
Patented June 20, 1911.
3 SHEETS—SHEET 2.
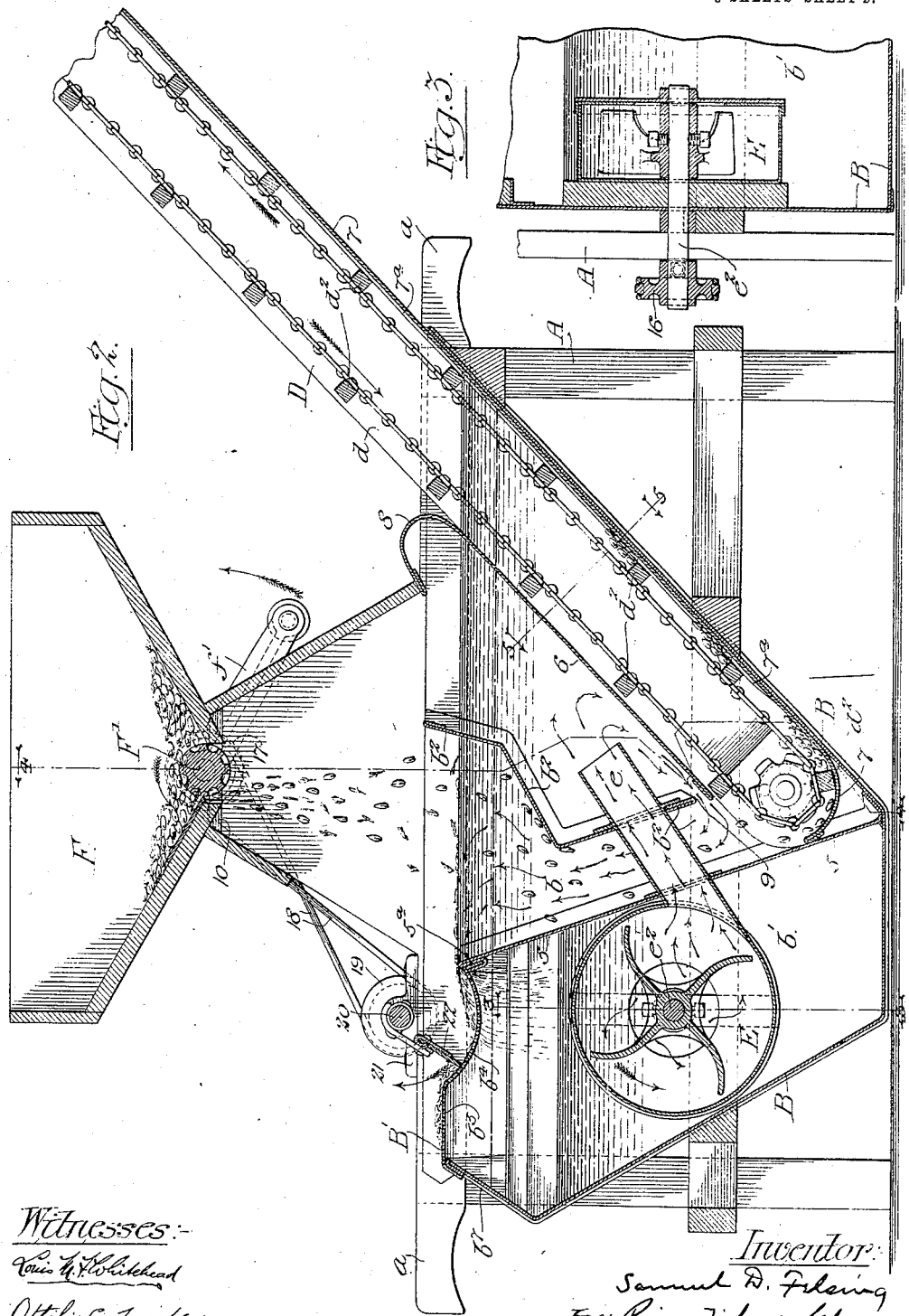

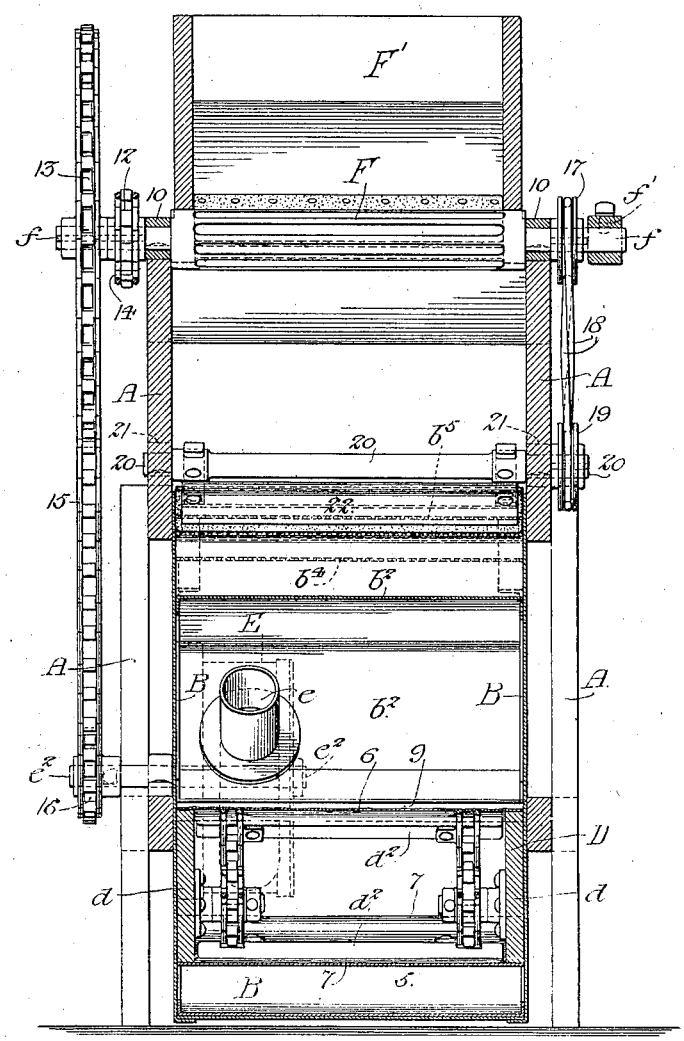

UNITED STATES PATENT OFFICE.

SAMUEL D. FELSING, OF CROOKSTON, MINNESOTA, ASSIGNOR OF ONE-HALF TO CHARLES LORING, OF CROOKSTON, MINNESOTA.

MACHINE FOR CLEANING AND SEPARATING SEED-GRAIN.

995,853.  Specification of Letters Patent.  Patented June 20, 1911.

Application filed January 28, 1911. Serial No. 605,205.

*To all whom it may concern:*

Be it known that I, SAMUEL D. FELSING, a resident of Crookston, county of Polk, and State of Minnesota, have invented certain new and useful Improvements in Machines for Cleaning and Separating Seed-Grain, of which I do declare the following to be a full, clear, and exact description, reference being had to the drawings forming part of this specification.

The present invention has for its object to provide an improved machine, more especially designed for the treatment of seed grain, so as to not only free the same from smut, but as well, also, from foreign material of various kinds, such as "king heads", chaff, etc., which would seriously detract from the value of the grain for seeding purposes.

The invention consists in the novel features of construction and combinations of parts hereinafter described, illustrated in the accompanying drawings and particularly pointed out in the claims at the end of this specification.

Figure 1 is a plan view of a machine embodying my invention. Fig. 2 is a view in central, vertical, longitudinal section on line 2—2 of Fig. 1. Fig. 3 is a view in vertical section on line 3—3 of Fig. 2. Fig. 4 is a view in vertical section on line 4—4 of Fig. 2. Fig. 5 is a view in cross section on line 5—5 of Fig. 2.

The framework A of the machine may be of any construction adapted to properly sustain the mechanism, this framework being shown as provided at its upper ends with handle bars $a$ whereby it can be conveniently handled.

Within the framework of the machine is arranged a tank B preferably of galvanized sheet iron, this tank being divided by a diaphragm 5 into two principal chambers or compartments $b$ and $b'$ adapted to contain the water whereby the cleansing and separation of the grain from foreign matter are effected. For convenience the chamber $b$ may be designated as the cleaning chamber, and the chamber $b'$ as the supply chamber. Ordinarily, the water within the tank B carries a solution of suitable chemicals adapted for the preserving of the grain. The chamber or compartment $b$ of the tank is intersected by a plate $b^2$ of irregular outline, the lower portion of this plate terminating at a distance above a plate 6 that is attached to the upper edges of the side bars $d$ of the conveyer D. As shown, there is a plate 7 attached to the lower edges of the side bars $d$ of the conveyer D (see Figs. 2 and 5), this plate 7 forming the bottom of the conveyer shaft and having its lower edge upwardly curved to receive the cleaned grain. The upper end of the plate 6 is preferably reversely curved, as at 8 to form a splash-board to prevent any splashing of the water from the tank. The conveyer D is shown as consisting of endless chains provided with cross slats or bars $d^2$ which serve to carry the cleaned grain upwardly and discharge it outside of the machine. The conveyer may be of any suitable length and may be driven in any convenient manner.

The bottom plate 7 of the conveyer D is formed with longitudinal ribs $7^a$ (see Figs. 2 and 5) that terminate or vanish at a slight distance above the lower curved portion of the plate 7. The purpose of these ribs $7^a$ is to hold the slats $d^2$ at a slight distance from the surface of the plate 7, so that while the clean grain is carried upward by the slats $d^2$ the water will freely flow backward into the tank. The conveyer D is preferably arranged so that it may be readily introduced into and removed from the tank B, thereby permitting the cleaning of the tank to be readily effected.

The vertically disposed plate $b^2$ divides the cleaning chamber of the tank into two sections that communicate with each other by the channel or passageway 9 that is formed between the lower end of the plate $b^2$ and the lower end of the plate 6. The plate $b^2$ is inclined, preferably as shown, toward the diaphragm 5, the central portion of the plate $b^2$ forming a deflector to guide the grain toward the contracted space between the lower part of the plate $b^2$ and the diaphragm 5.

The circulation of liquid between the supply chamber $b'$ and the cleaning chamber $b$ is preferably effected by a rotary pump E and the pipe or spout $e$ leading from this pump is arranged so as to cause the water from the supply chamber $b'$ to be delivered into the chamber at one side of the plate $b^2$ and to pass thence through the channel 9 into the other lower part of said cleaning chamber with an upward current, whence it will escape over the upper edge of the diaphragm 5 and back into the supply chamber $b'$. Preferably the discharge pipe or spout $e$ of the pump E passes through the diaphragm 5 and the plate $b^2$ of the cleaning chamber. This pump E may be of any suitable or familiar construction, that shown comprising a casing open at one end and having the spout $e$ fixed to its periphery.

The purpose of the pump E is to effect a circulation of the water between the supply chamber $b'$ and the cleaning chamber $b$ of the tank B, and when the pump is in operation the water within the chamber $b$ is at a higher level than the water within the chamber $b'$, and the action of the pump serves to cause the water to overflow from the cleaning chamber $b$ across the upper edge of the plate 5 and down again into the supply chamber $b'$, as indicated in Fig. 2 of the drawings.

Across the top of the supply chamber $b'$ extends a reticulated cover or screen B' which, while permitting the water to flow freely therethrough, serves to arrest the foreign matter, such as king heads, chaff or the like, in manner to be presently more fully described. The screen B' is shown as removably mounted, one of its edges being set within a hook shaped flange $5^a$ at the top of the diaphragm 5, while its other edge extends over the inclined upper portion $b^7$ of the tank B.

The grain to be cleaned will be placed within a hopper F that is mounted above the machine, as shown, the bottom of this hopper being provided with a grooved feed wheel F' whereby the discharge of the grain from the hopper is effected. The shaft $f$ of the feed wheel F' is mounted in suitable bearings 10 at the top of the supplemental frame A'. One end of this shaft $f$ is shown as provided with a handle $f'$ whereby the parts may be operated, and the opposite end of the shaft $f$ is shown as provided with two sprocket wheels 12 and 13. Around the sprocket wheel 12 passes a suitable chain 14 that will lead to the upper shaft (not shown) whereby the chains of the conveyer D are driven. The sprocket wheel 13 is connected by a chain 15 with a sprocket wheel 16 on the shaft $e^2$ of the rotary pump E. Upon the shaft $f$ is also fixed a small pulley 17 that is connected by a cross belt 18 with a similar pulley 19 upon the shaft 20 that is journaled in suitable bearings 21 on the top of the main frame A. This shaft 20 has fixed thereto a discharge blade or wiper 22 that serves to sweep the foreign matter (chaff, king heads, etc.) from the depressed or concave portion $b^4$ of the reticulated cover or screen B' and onto the flat surface $b^5$ of such screen, as will more fully appear. The hopper F and the feed wheel F' are so arranged with respect to the tank B as to deliver the grain to the tank upon the surface of the water in the chamber $b$ at a point between the upper part of the plate $b^2$ and the upper edge of the diaphragm 5, and the plate $b^2$ is formed with an inclined, central portion to deflect the grain downward into the contracted space between the lower portion of the plate $b^2$ and the diaphragm 5.

The rotary pump E occupies comparatively little space within the supply chamber $b'$ and as the spout $e$ of this pump enters the chamber $b$ of the tank, it will be seen that when the pump is started in operation it will cause the water to pass from the supply chamber $b'$ of the tank into the cleaning chamber $b$ at a point back of the plate $b^2$ and the water will pass thence (as indicated by the arrows in Fig. 2) downward through the channel 9 and then upward between the diaphragm 5 and the plate $b^2$ and over the upper edge of the diaphragm 5. The grain to be cleaned will be dropped from the hopper F, as indicated in Fig. 2, upon the still surface of the water between the diaphragm 5 and plate $b^2$ and will descend in opposition to the upward current of water toward the bottom of the tank B, where it will be caught by the curved lower end of the plate 7 and will be carried thence outward by the conveyer from the machine. The lighter material, such as chaff, king heads or like foreign matter will float upon the surface of the water and will be carried off by the current over the upper edge of the diaphragm 5 and will be delivered into the concave portion of the reticulated cover B', the water draining through the cover and back into the supply chamber $b'$ of the tank B. As the blade or wiper 22 revolves in the direction of the arrows in Fig. 2, it will sweep the foreign matter thus delivered to the screen B' onto the flat portion or extension $b^5$ of the said screen B', from which it will be gradually pushed off into a suitable receptacle (not shown) at the end of the machine. It will be seen, however, that as the foreign matter is thus accumulated and gradually pushed off the flat portion or extension $b^5$ of the screen B' the water will drain away from it and fall back into the tank, so that there is comparatively little loss of water, the same water being used over and over again. By delivering the grain into the tank against the current of water flowing upwardly between the diaphragm 5 and the plate $b^2$, the grain will be most effectually cleaned before it reaches the lower portion of the tank and is caught by the conveyer D (if a conveyer be employed), so that even if any light, foreign matter temporarily adheres to the grain it will be separated therefrom by the up-flowing current of water and will be carried off over the top edge of the diaphragm 5.

My invention provides an exceedingly simple and effective apparatus whereby the cleaning of seed grain, and especially wheat, can be secured; but while I have described what I regard as the preferred embodiment of the invention, I wish it distinctly understood that the details above set out may be varied within wide limits without departing from the spirit of the invention, and that features of the invention may be employed without its adoption as an entirety.

Having thus described my invention, what I claim as new and desire to secure by Letters Patent, is:—

1. An apparatus of the character described comprising a supply chamber, a cleaning chamber, means for causing the circulation of liquid between said chambers with an upward current in the cleaning chamber, means for delivering grain into the cleaning chamber against the upward flow of current therein, a screen extending outward from the top of the cleaning chamber and means arranged above said screen for automatically moving the foreign material across the screen and away from the top of the cleaning chamber.

2. An apparatus of the character described comprising a supply chamber, a cleaning chamber having an expanded compartment to receive the screen and a contracted lower portion with an opening adjacent its bottom for the admission of liquid, means for causing a circulation of liquid between the supply chamber and the cleaning chamber with an upward current of liquid in the cleaning chamber, a screen extending outward from the top of said cleaning chamber, a movable device arranged above said screen for sweeping the foreign material away from the discharge side of said cleaning chamber, a hopper for delivering grain to the cleaning chamber and a conveyer for removing the cleaned grain from the cleaning chamber.

3. An apparatus of the character described comprising a supply chamber, a cleaning chamber divided into two compartments with a passageway for liquid from one compartment to the other, whereby an upward flow of liquid is obtained in one of said compartments, means for causing a circulation of liquid between the supply chamber and the other of said compartments of the cleaning chamber, means for delivering grain into the compartment of the cleaning chamber in which there is an upward flow of liquid and a screen arranged in the path of the liquid passing from the cleaning chamber to the supply chamber.

4. An apparatus of the character described comprising a supply chamber, a cleaning chamber divided into two compartments connected by a passageway for liquid adjacent their bottoms, the compartment nearest the supply chamber being formed with an expanded upper portion and a lower contracted portion, means for delivering grain into said last mentioned compartment, means for maintaining a circulation of liquid between the supply chamber and the compartment of the cleaning chamber farthest from the supply chamber, and a screen arranged in the path of the liquid passing from the cleaning chamber to the supply chamber.

5. An apparatus of the character described comprising a supply chamber, a cleaning chamber, means for causing a circulation of liquid between said chambers with an upward current in the cleaning chamber, a diaphragm between the chambers over the top of which the liquid will return from the cleaning to the supply chamber, a screen extending from the top of said diaphragm over the supply chamber, said screen having a concaved portion, a rotary blade or wiper arranged above said concaved portion of the screen for moving foreign material over the screen, a hopper for delivering grain to the cleaning chamber and a suitable conveyer for carrying grain away from the cleaning chamber.

6. An apparatus of the character described, comprising a supply chamber, a cleaning chamber, means for causing a circulation of liquid between said chambers with an upward current in the cleaning chamber, a diaphragm between the chambers over the top of which the liquid will return from the cleaning to the supply chamber, a screen extending from the top of said diaphragm over the supply chamber, said screen having a concaved portion and an extension at the discharge end of said concaved portion arranged above the supply chamber, means for moving the foreign material across said screen, a hopper for delivering grain to the cleaning chamber, and a suitable conveyer for carrying the cleaned grain away from said chamber.

7. An apparatus of the character described, comprising a supply chamber, a cleaning chamber provided with a vertically disposed plate dividing said chamber into two compartments, means for producing a circulation of liquid between the supply and cleaning chambers, said means being arranged to deliver the liquid at one side of said vertically disposed plate, said cleaning chamber being provided at its lower portion with a channel to cause an upward current of liquid at the opposite side of said vertically disposed plate, means for delivering grain to be cleaned against said upward current, and a screen at the top of said cleaning chamber for arresting foreign material carried by the liquid in its flow from the cleaning chamber to the supply chamber.

8. An apparatus of the character described, comprising a supply chamber, a cleaning chamber provided with a vertically disposed plate dividing said cleaning chamber into two compartments, means for producing a circulation of liquid between said supply and cleaning chambers and provided with a spout leading through said plate, there being a channel adjacent the bottom of said plate to cause an upward current of liquid in one of said compartments, means for delivering grain to be cleaned against the upward current of liquid in said compartment, and suitable means for removing the cleaned grain.

9. An apparatus of the character described, comprising a supply chamber, a cleaning chamber divided into two compartments connected at their bottoms by a channel, means for delivering grain to be cleaned at the top of one of said compartments, means for causing a circulation of liquid from the supply chamber to the other of said compartments, whereby an upward flow of current will be produced from said channel into the compartment to which the grain will be delivered, a screen arranged in the path of the overflow from the cleaning chamber to the supply chamber, and suitable means for removing the cleaned grain from the bottom of the cleaning chamber.

10. An apparatus of the character described, comprising a supply chamber, a cleaning chamber provided with a vertically disposed plate dividing said chamber into two compartments, one of said compartments being contracted toward its bottom and being provided adjacent its bottom with a channel for the passage of liquid, the other of said compartments being provided with means for delivering liquid thereto from the supply chamber, means for producing a circulation of liquid from the supply chamber to the cleaning chamber, with an upward current through the compartment having a contracted lower portion, means for delivering grain into the cleaning chamber against said upward current, a screen at the top of the cleaning chamber and in the path of the outflowing current of liquid, and a suitable conveyer for carrying away the cleaned grain from the bottom of said cleaning chamber.

11. An apparatus of the character described comprising a cleaning chamber, a supply chamber, means for causing the circulation of liquid between the two chambers with an upward current in the cleaning chamber, means for delivering grain to the cleaning chamber against the upward flow of current therein, a screen in the path of the liquid from the cleaning chamber to the supply chamber, a conveyer extending from the bottom of the cleaning chamber to a point outside said chamber, said conveyer having transverse slats and having a bottom plate provided with longitudinal ribs over which said slats will move.

12. An apparatus of the character described, comprising a tank having a transverse diaphragm dividing said tank to form a supply chamber and a cleaning chamber, a screen at the top of said diaphragm and extending over said supply chamber, a vertically disposed plate arranged in said cleaning chamber and dividing the same into two compartments, a pump having a discharge pipe leading into one of said compartments of the cleaning chamber, the other of said compartments having an inlet channel at its bottom whereby an upward current of liquid within said compartment will be produced, means for delivering grain into the cleaning chamber against the upward current of liquid therein and a conveyer arranged in the bottom of said cleaning chamber to remove the cleaned grain therefrom.

SAMUEL D. FELSING.

Witnesses:
MINNIE E. MILETTE,
JOHN J. FLYNN.

Copies of this patent may be obtained for five cents each, by addressing the "Commissioner of Patents, Washington, D. C."